United States Patent
Jain et al.

(10) Patent No.: US 11,194,816 B2
(45) Date of Patent: Dec. 7, 2021

(54) STRUCTURED ARTICLE GENERATION

(71) Applicant: International Business Machines Corporation, Armonk, NY (US)

(72) Inventors: Parag Jain, Jabalpur (IN); Abhijit Mishra, Bangalore (IN); Anirban Laha, Hooghly (IN); Saravanan Krishnan, Vellore (IN); Karthik Sankaranarayanan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/655,064

(22) Filed: Oct. 16, 2019

(65) Prior Publication Data

US 2021/0117431 A1  Apr. 22, 2021

(51) Int. Cl.
*G06F 16/2457* (2019.01)
*G06F 16/2453* (2019.01)
(Continued)

(52) U.S. Cl.
CPC .... *G06F 16/24575* (2019.01); *G06F 16/2365* (2019.01); *G06F 16/2456* (2019.01);
(Continued)

(58) Field of Classification Search
CPC ......... G06F 16/24575; G06F 16/24534; G06F 16/24522; G06F 16/2456; G06F 16/2365; G06F 16/252
See application file for complete search history.

(56) References Cited

U.S. PATENT DOCUMENTS

| 8,214,386 B2 | 7/2012 | Shapiro et al. |
| 2015/0039297 A1* | 2/2015 | Greer .................. G06F 3/0481 704/9 |

(Continued)

FOREIGN PATENT DOCUMENTS

WO    WO2017135488 A1    8/2017

OTHER PUBLICATIONS

Leo Leppanen et al., "Data-Driven News Generation for Automated Journalism", Proceedings of the 10th International Natural Language Generation Conference, Santiago de Compostela, Spain, Sep. 4-7, 2017, 10 pages, Association for Computational Linguistics.

*Primary Examiner* — Haoshian Shih
*Assistant Examiner* — Darrin Hope
(74) *Attorney, Agent, or Firm* — Ference & Associates LLC

(57) ABSTRACT

One embodiment provides a method, including: receiving, from a user, input for generating an article, wherein the input comprises (i) an indication of topic-specific requirements for the article that are dependent upon a topic of the article and (ii) an indication of non-topic-specific requirements for the article that are independent of the topic of the article; creating at least one query from the input; retrieving, from secondary sources by performing a search utilizing the query, structured information contextually relevant to the topic; and from the structured information, generating the article, wherein the article comprises a coherent and grammatically fluid structured article generated in view of the topic-specific requirements and the non-topic-specific requirements.

20 Claims, 3 Drawing Sheets

(51) Int. Cl.
*G06F 16/25* (2019.01)
*G06F 16/2455* (2019.01)
*G06F 16/23* (2019.01)
*G06F 16/2452* (2019.01)

(52) U.S. Cl.
CPC .. *G06F 16/24522* (2019.01); *G06F 16/24534* (2019.01); *G06F 16/252* (2019.01)

(56) References Cited

U.S. PATENT DOCUMENTS

2018/0060287 A1* 3/2018 Srinivasan ............ G06F 40/169
2018/0365196 A1 12/2018 Barraclough et al.
2019/0095438 A1 3/2019 Henderson et al.
2019/0213216 A1* 7/2019 Wang ..................... G06F 16/31

* cited by examiner

STRUCTURED ARTICLE GENERATION

BACKGROUND

Articles (e.g., news articles, magazine articles, journal articles, etc.) may be used as a source of information. People may consume the articles to learn more about current events, historical events, people, companies, other entities, facts, opinions, and the like. The writers of the articles generally have to spend a significant amount of time to research the topic of the article in order to provide an article that is accurate. Additionally, the writers have to spend a significant amount of time writing the article in order to ensure that the article conveys the intended information accurately and coherently. The writer may also employ the use of an editor to proofread the article before publication in order to ensure coherence and grammatical correctness. Thus, the creation of articles is a very time-consuming process.

BRIEF SUMMARY

In summary, one aspect of the invention provides a method, comprising: receiving, from a user, input for generating an article, wherein the input comprises (i) an indication of topic-specific requirements for the article that are dependent upon a topic of the article and (ii) an indication of non-topic-specific requirements for the article that are independent of the topic of the article; creating at least one query from the input; retrieving, from secondary sources by performing a search utilizing the query, structured information contextually relevant to the topic; and from the structured information, generating the article, wherein the article comprises a coherent and grammatically fluid structured article generated in view of the topic-specific requirements and the non-topic-specific requirements.

Another aspect of the invention provides an apparatus, comprising: at least one processor; and a computer readable storage medium having computer readable program code embodied therewith and executable by the at least one processor, the computer readable program code comprising: computer readable program code configured to receive, from a user, input for generating an article, wherein the input comprises (i) an indication of topic-specific requirements for the article that are dependent upon a topic of the article and (ii) an indication of non-topic-specific requirements for the article that are independent of the topic of the article; computer readable program code configured to create at least one query from the input; computer readable program code configured to retrieve, from secondary sources by performing a search utilizing the query, structured information contextually relevant to the topic; and computer readable program code configured to, from the structured information, generate the article, wherein the article comprises a coherent and grammatically fluid structured article generated in view of the topic-specific requirements and the non-topic-specific requirements.

An additional aspect of the invention provides a computer program product, comprising: a computer readable storage medium having computer readable program code embodied therewith, the computer readable program code executable by a processor and comprising: computer readable program code configured to receive, from a user, input for generating an article, wherein the input comprises (i) an indication of topic-specific requirements for the article that are dependent upon a topic of the article and (ii) an indication of non-topic-specific requirements for the article that are independent of the topic of the article; computer readable program code configured to create at least one query from the input; computer readable program code configured to retrieve, from secondary sources by performing a search utilizing the query, structured information contextually relevant to the topic; and computer readable program code configured to, from the structured information, generate the article, wherein the article comprises a coherent and grammatically fluid structured article generated in view of the topic-specific requirements and the non-topic-specific requirements.

A further aspect of the invention provides a method, comprising: receiving domain dependent input identifying requirements that are based upon a subject for an article to be generated; receiving domain independent input identifying requirements that are independent of the subject for the article to be generated; retrieving structured information related to the subject by querying at least one resource utilizing the domain dependent input, wherein the querying comprises expanding the domain dependent input utilizing (i) at least one domain ontology and (ii) natural language processing techniques; and generating the article from the structured information, wherein the generating comprises joining the structured information into a coherent and grammatically fluid document utilizing (i) a cross entropy loss algorithm and (ii) a hierarchical topic loss algorithm.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
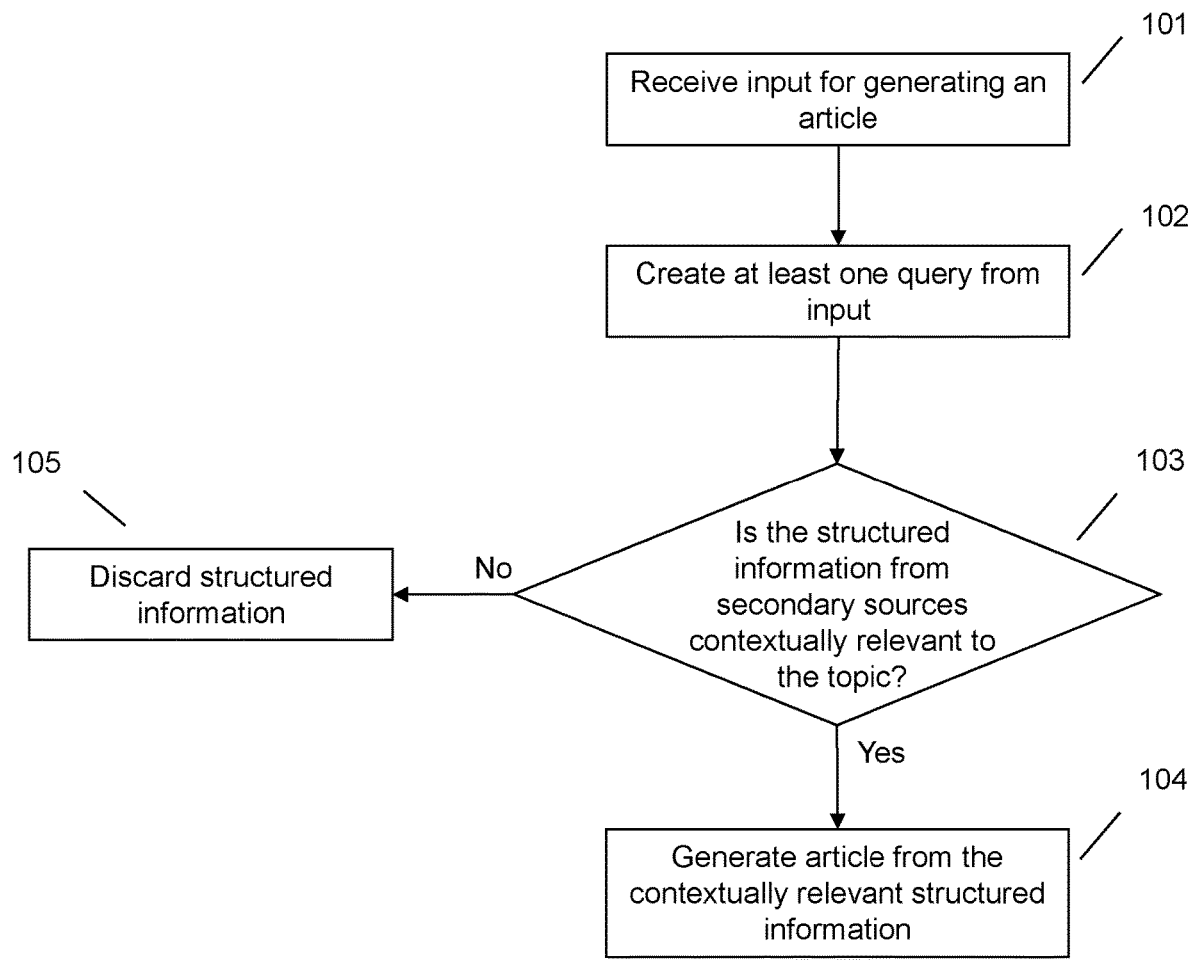
FIG. 1 illustrates a method of generating a structured article from secondary sources utilizing input from a user that identifies both topic-specific and non-topic-specific requirements for the article.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Traditional manual article generation is a very time-consuming process in both performing research for the article and writing the article. Since many publications that use articles (e.g., newspapers, magazine, blogs, web articles, etc.) are generally published in a predetermined cycle (e.g., weekly, monthly, daily, etc.), creation of the publication requires many hours. Publications that have multiple articles generally require the use of many different article writers and editors to ensure that all the articles necessary for the publication can be written and proofread in time for the next publication cycle. Thus, automating at least a portion of article generation is desirable to ensure that enough articles will be generated for a publication. Additionally, since many articles are provided over a network connection (e.g., the Internet), thereby allowing many different users to access the articles, many readers expect to have access to articles discussing current events quickly after the event occurs. Thus, automating article generation is desirable to allow for the quick generation of the articles.

A known technique for creating news, is randomly generating news based upon a predefined topic and a predefined template. In other words, the system is programmed to randomly generate news based upon a topic that is already programmed within the system. Additionally, the news generation is performed utilizing templates that identify specific information to be obtained and the location within the article that the information should be placed. Another conventional technique will find already written articles, for example, on the Internet, and then copy these articles to another location, for example, on a blog of a user. Another conventional technique will take a template that is created by a user, where the template specifies the type of information and the location of the information within the article, and then generate natural language sentences of news to match the template. However, these techniques do not truly generate an article from scratch. Rather, the systems either require an identified template or simply copy and paste articles from one source to a location. Thus, the techniques do not allow for the generation of an article without significant input from a user.

Additionally, when the systems pull information from a source, the systems are not able to join the information into coherent and grammatically fluid articles. For example, a technique that utilizes extraction and concatenation will result in incoherent results. The results will have issues with referring expressions, coherency, blending of topics, traditional article formats and structures, and the like, when joining the text into a larger document. This is because the system simply takes the extracted text and joins the text together into lines of text with no insight into the readability of the joined text. As another example, a common technique for text summarization, seq2seq, requires training utilizing parallel data and must be trained for every topic. Thus, the training data that would be necessary for using such an approach would be very expansive. Additionally, the time necessary for compiling the training data for every possible topic that could be used within an article would be very extensive and simply not practical. Thus, these systems are impractical for creating a structured article.

Accordingly, an embodiment provides a system and method for generating a structured article from secondary sources utilizing input from a user that identifies both topic-specific and non-topic-specific requirements for the article. The system receives input for generating an article from a user. The input includes both topic-specific or topic dependent requirements and non-topic-specific or topic independent requirements. Topic dependent requirements are requirements that are unique to the article that the user wants generated and are based upon the topic or context of the article. Examples of topic dependent requirements include a topic of the article, a timeframe for the article, sections or subtopics to be included in the article, images related to the topic, and the like. Topic independent requirements are requirements that are not unique to the target article and that can be used for all articles generated by the system regardless of the topic. Examples of topic independent requirements include a structure for the article, a format of the article, a language of the article, a minimum/maximum word count, and the like.

From the input the system creates at least one query. The query is used to search secondary sources (e.g., webpages, databases, local resources or data storage locations, remote resources or data storage locations, etc.) and retrieve structured information (e.g., sentences, paragraphs, phrases, etc.)

that is contextually relevant to the topic of the article. For example, the system may use the input to generate a query that can be used to perform an Internet search for information related to the topic of the article. From the structured information the system generates a structured article. In this case, structured means a document or article that is presented in a structured format, for example, a format that is traditional for an article and is coherent and grammatically fluid, as if a person wrote the article. To ensure that the article is coherent and grammatically fluid, the system utilizes one or more algorithms that ensure the joining of text results in text that is both coherent and grammatically correct.

Such a system provides a technical improvement over current systems for article generation. Rather than relying on a person to manually find the information for an article and then manually generate the article, the system is able to utilize user input identifying topic-specific and non-topic-specific requirements to generate a structured article. From the requirements the system is able to generate queries that can be used to find information relevant to the desired topic, thereby providing a system that does not have to be programmed for a particular topic unlike some conventional systems. Additionally, using unique text joining techniques to combine the information together provides a system that can maintain coherency and grammatical fluidity for the structured article, that is not possible using traditional text joining techniques. Accordingly, the system can generate structured articles in a dynamic fashion that is not possible using conventional techniques.

FIG. 1 illustrates a method for generating a structured article from secondary sources utilizing input from a user that identifies both topic-specific and non-topic-specific requirements for the article. At 101, the system receives input for generating an article from a user. The input includes both an indication of topic-specific requirements for the article and non-topic-specific requirements. Topic-specific or topic dependent requirements are those requirements that are dependent upon a topic or domain of the article. In other words, topic-specific requirements are those requirements that will change with each article that is generated utilizing the system because the topic and context or environment of the article will change with each article. Thus, the system is a dynamic system that allows a user to specify the article to be generated at run-time, and the system has the resources and ability to generate the article regardless of the topic or domain that is specified by the user at run-time. Example topic-specific requirements include the topic of the article, sub-topics the user wants included in the article, a timeframe that the article should cover, particular types of images the user wants included in the article, and the like. For example, a user may provide an input to generate an article describing a particular company's performance over the last year. This input would be a topic dependent requirement.

Non-topic-specific or topic independent requirements are those requirements that are independent of the topic or domain of the article. In other words, non-topic-specific requirements are those requirements that can be maintained across multiple articles regardless of the topic or domain of the articles. Example non-topic-specific requirements include a word count range or article length, a structure of the article, a format of the article, a language the article should be written in, a number of images or tables that should be included in the article, and the like. Topic independent requirements may be specified by the user at run-time.

Alternatively, since the topic independent requirements are not unique to a particular article topic, the topic independent requirements may be specified at a different time, for example, before any topic dependent requirements are provided. For example, if the article is being generated for a larger publication, the publication may have requirements for the articles that are included in the publication. Accordingly, the topic independent requirements can be provided to the system before any articles are generated and indicate that such requirements should be used with all or a subset of articles that are generated. Thus, the topic independent may be effectively default requirements that are provided to the system by a user. The ability of a user to not only define topic dependent requirements, but also topic independent requirements, is something that is not possible using conventional techniques.

At 102, the system creates at least one query from the input received at 101. The query is generally generated from the topic dependent requirements that the user provided. In other words, the query is typically created from the topic dependent requirements. This is due to the fact that the topic dependent requirements would define the information that the user would like to obtain to include in the article, whereas the topic independent requirements generally define how the article should appear once it is generated. However, the query may be augmented based upon topic independent requirements. For example, if one of the topic independent requirements is that the article needs to contain a particular number of images, the system may augment a query created from the topic dependent requirements with an image filter so that images can be retrieved. Thus, the topic independent requirements may be used to filter or augment results that are retrieved utilizing the topic dependent requirement query.

To create the query, the system analyzes the natural language input that was received from the user to generate query expressions. Query expressions are the machine language query formats that are used by a processor to perform a query. In other words, the system analyzes the natural language input received by the user and converts it into a machine language format that is able to be read and processed by the query system. Accordingly, the system may utilize language processing algorithms and techniques for converting the natural language input to the machine language query. Example language processing algorithms include time range expression analyzers that convert time frames into date ranges, parts of speech analyzers that identify key words within the natural language input, lemmatizers that convert words into a base form of the word, tokenization algorithms that substitute words with generic terms, and the like. The system may also utilize entity look-up tables that may identify spelled-out or full phrases for acronyms, other names for entities, pointers for referring expressions, and the like.

Additionally, the system may expand the input to include additional query expressions in order to receive more relevant information responsive to the query. For example, the system may utilize a domain ontology to enrich the query by adding filters or additional terms to the query. The domain ontology may be unique to the topic that was identified within the input. The ontology may identify concepts that are related to the topic that was identified in the input, thereby allowing for the ability to identify information that is related to or contextually relevant to the identified topic. As another example, the system may expand the query by adding subsections to the input. For example, if the system recognizes that a topic has a logical connection to the provided input, the system may identify that this topic should be included as a subsection within the article. As an example, if the received input identifies that the article should include a section about the people within a company, the system may identify that a logical subsection within the people section would be a subsection about the important people in the company. Accordingly, the system may expand the query to include the subsection within the query.

The system then utilizes the query to perform a search on one or more secondary sources (e.g., Internet, databases, remote/local resources or data storage locations, etc.), which may, and usually does, include natural language text. Since the system does not require the secondary sources or resources to be labeled to be utilized, the system can use any secondary sources that are accessible to the system. In other words, the system will work regardless of whether the resources are labeled or annotated, thereby allowing the system to access and utilize any and all secondary sources that can be accessed by the system. The query returns structured information (e.g., paragraphs, sentences, phrases, pages, etc.) from the secondary sources. The structured information may be returned as natural language results. Additionally, the query may return information in other modalities, for example, audio, video, images, tables, and the like. Thus, the information utilized in generating the article can include information represented in multiple modalities.

From the results of the query, the system can cluster paragraphs or other structured information into clusters of similar topics. In other words, the system clusters the information from the secondary sources that relates to the same section or subsection of the article. From these clusters, the system detects the topics of the clusters. Specifically, the system may use hierarchical topic detection to identify the topics of the paragraphs and identify the hierarchy of the topics within the paragraphs. Using the detected topics, the system can determine if the topic of the clusters is contextually relevant to the topic of the article. Determining if a topic is contextually relevant can be performed using different topic similarity techniques, for example, similarity measures, distance functions, and the like. Thus, at 103, the system determines if the structured information returned from the secondary sources is contextually relevant to the topic. If it is not contextually relevant, the system discards that structured information at 105. Utilizing the contextually relevant structured information, the system generates the requested article at 104. Thus, using the algorithms, the system can ensure that the information utilized in the article is relevant and conforms to both the topic-specific requirements and the non-topic-specific requirements.

In generating the article, the system generates a structured article. In this case, structured means a document or article that is presented in a structured format, for example, a format that is traditional for an article and is coherent and grammatically fluid, as if a person wrote the article. In other words, the system generates an article that is well-structured, consistent with conventional writing guidelines (e.g., starting with an introduction, followed by a body, and ending with a conclusion, etc.), coherent, adequate with respect to the input, and grammatically correct. To perform the article generation the system may structure the article using the structure identified by the topic independent requirements. Additionally, if the system identified subsections for any sections of the article, the system may include those subsections in the article generation. The article may also include information represented in different modalities, for example, text, images, links, tables, video, audio, and the like. Additionally, the article is generated in view of any of the topic independent requirements. For example, if the user identified an article length requirement, the article is generated in view of this requirement. As another example, if the user identified a language that the article should be provided in, the article is generated in that language.

To generate the article, the system joins the structured information that was retrieved from the secondary sources into the structured format of the article. Simply concatenating and joining the retrieved structured information will result in an output that is not coherent and will not follow a structure, for example, sections and subsections of the article will not be blended together. Accordingly, the system utilizes algorithms to maintain coherency and grammatical fluidity within the article. One algorithm that the system may utilize is a cross entropy loss algorithm. Another algorithm the system may utilize is a hierarchical topic loss algorithm. The system may utilize these algorithms on two text strings that are to be combined together to determine if combining them would result in a coherent and grammatically fluid combination. For example, using the hierarchical topic loss algorithm the system can provide the input text to the algorithm. The algorithm identifies the hierarchical topic of the input text. The system can then identify the output text (i.e., the combined text) and identify the hierarchical topic of the output text. The system can then identify a loss of coherency and grammatical fluidity based upon the cross entropy of the input and output hierarchical topics. Thus, the system can determine if the combination of the text strings would result in a coherent and grammatically fluid combination. The system then performs such an analysis as the system joins together the structured information retrieved from the secondary sources to create the structured article.

Figure 2:
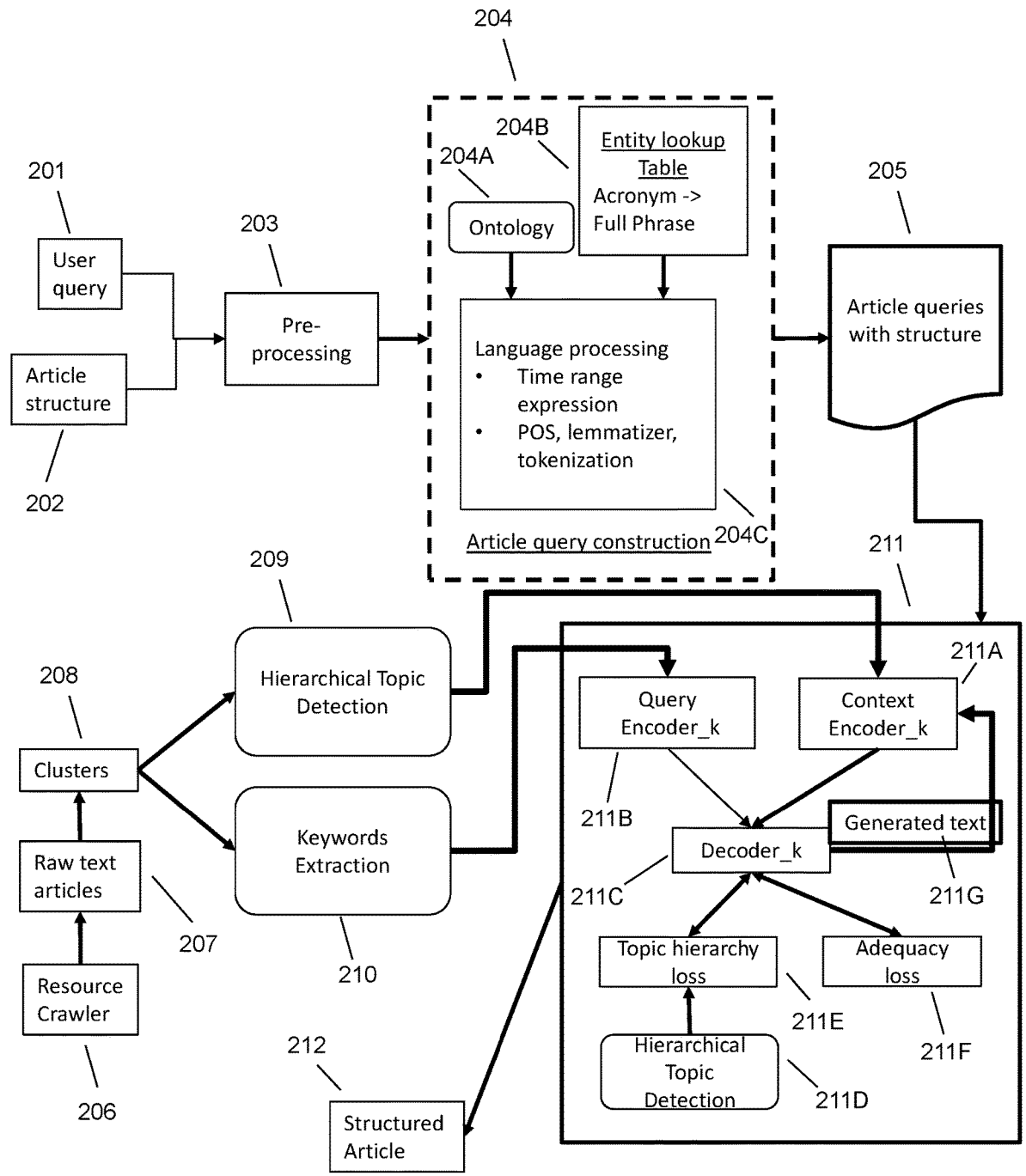
FIG. 2 illustrates an example system architecture for generating a structured article from secondary sources utilizing input from a user that identifies both topic-specific and non-topic-specific requirements for the article.

FIG. 2 illustrates an example overall system architecture of the system and method described herein. At 201 the system receives the user query or user input and any other topic dependent requirements. The user also identifies the article structure 202 and any other topic independent requirements. The system preprocesses this input at 203, for example, by converting the input to machine language, filtering unnecessary information from the input, and the like. The system then creates the query to be used on the secondary sources at 204. Creating the query 204 may include utilizing an ontology 204A, entity lookup table 204B, language processing techniques 204C, and the like. The created query may then be utilized to retrieve contextually relevant information 205.

The system may utilize a resource crawler 206 to identify secondary sources or resources that contain contextually relevant information, for example, utilizing the generated query 205. The system returns the raw text articles 207 and clusters the articles or information from the articles into topic clusters 208. The system then uses a hierarchical topic detection technique 209 to identify the topic corresponding to each cluster 208. The system also extracts keywords 210 from each of the clusters 208. Using the generated query 205 and clusters 208 with the identified topic 209 and extracted keywords 210, the system generates the structured article 212 using the article generator 211. The article generator 211 may include using a context encoder 211A and query encoder 211B in conjunction with a decoder 211C to generate text 211G. To ensure that coherency and grammatical fluidity is maintained, the system also employs a topic hierarchy loss algorithm 211E that utilizes a hierarchical topic detection technique 211D, and an adequacy loss algorithm 211F in generating the text 211G. From the generated or joined text 211G, the system can generate the structured article 212.

Such a system and method provide a technical improvement over current techniques for article generation. Since the system is able to take as an input, and utilize, a desired article structure, the described system and method provides a significant improvement over conventional techniques, none of which account for a user provided structure in generating the article. Since the system is able to take input from a user that defines the topic and structure of the article and generate a structured, coherent, and grammatically fluid article, the system reduces the amount of time that a user has to manually spend researching and writing and article. Additionally, since the system does not have to be trained on every possible topic like some conventional techniques, the system reduces the amount of time that would be required to compile and create the training material to train the system. Thus, the described system and method allows for the generation of structured articles that are coherent and accurate with respect to the identified topic, which is not possible using conventional techniques that simply copy and paste news from one location to another or join information together based upon a user-defined template.

Figure 3:
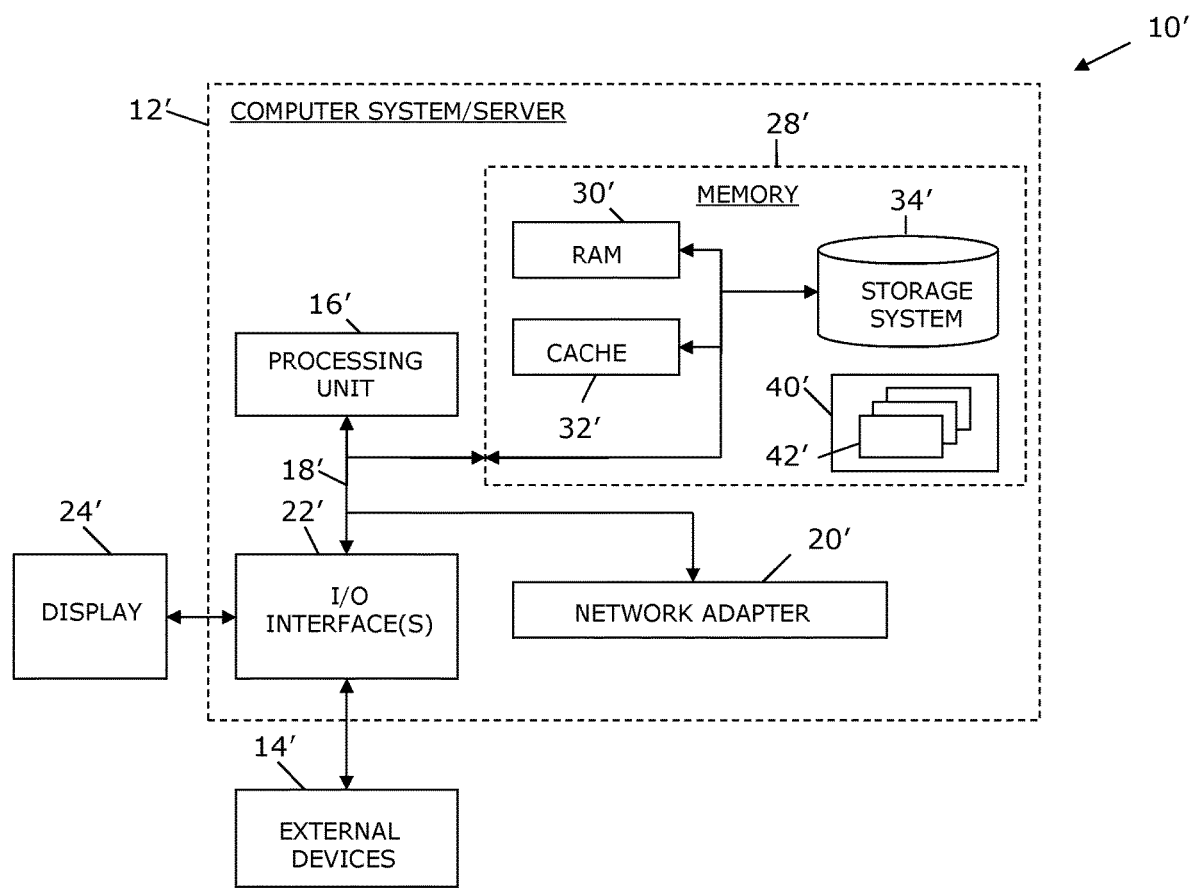
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, using a processor of a system and from a user, input for generating an article, wherein the input comprises (i) an indication of topic-specific requirements for the article that are dependent upon a topic of the article and (ii) an indication of non-topic-specific requirements for the article that are independent of the topic of the article;
   creating, using a natural language processing algorithm and from the topic-specific requirements, at least one query from the input, wherein the at least one query comprises a machine language query expression, wherein the creating comprises augmenting the at least one query based upon at least one of the non-topic-specific requirements, wherein the creating comprises expanding the input by adding additional query expressions to the at least one query, wherein the additional query expressions are based in part on subsections added to the input, wherein the subsections are identified based upon a logical connection between a topic corresponding to the subsection and the input;
   retrieving, from secondary data sources identified using a resource crawler and by performing a search at the secondary data sources utilizing the query, structured information contextually relevant to the topic, wherein at least one of the secondary data sources comprises an unlabeled secondary data source accessible to an article generation system; and
   from the structured information, generating, using an article generator component of the system and comprising a context encoder, query encoder, and decoder, the article, wherein the article comprises a coherent and grammatically fluid structured article generated in view of the topic-specific requirements and the non-topicspecific requirements, wherein the generating comprises joining, utilizing at least one algorithm, sections of the structured information, wherein the utilizing at least one algorithm comprises applying the at least one algorithm to each of the sections to identify a coherence of the joining of the sections.

2. The method of claim 1, wherein the creating comprises expanding the input to define a query expression.

3. The method of claim 2, wherein the expanding comprises accessing a domain ontology to enrich the at least one query, by adding expressions to the at least one query.

4. The method of claim 2, wherein the expanding comprises (i) adding subsections to the topic-specific requirements and (ii) utilizing the subsections within the at least one query.

5. The method of claim 1, wherein the generating comprises joining the structured information into the article.

6. The method of claim 5, wherein the generating comprises utilizing a cross entropy loss algorithm to maintain coherency and grammatical fluidity during the joining.

7. The method of claim 5, wherein the generating comprises utilizing a hierarchical topic loss algorithm to maintain coherence and grammatical fluidity during the joining.

8. The method of claim 5, wherein the generating comprises utilizing a hierarchical topic loss algorithm to ensure content of the article conforms to the topic-specific requirements.

9. The method of claim 1, wherein the retrieving comprises (i) clustering paragraphs from the secondary sources, (ii) detecting topics within the clustered paragraphs, and (iii) identifying, utilizing the detected topics, clusters of paragraphs contextually relevant to the topic.

10. The method of claim 1, wherein the secondary sources comprise unlabeled natural language sources.

11. An apparatus, comprising:
at least one processor; and
a non-transitory computer readable storage medium having computer readable program code embodied therewith and executable by the at least one processor, the computer readable program code comprising:
computer readable program code configured to receive, from a user, input for generating an article, wherein the input comprises (i) an indication of topic-specific requirements for the article that are dependent upon a topic of the article and (ii) an indication of non-topic-specific requirements for the article that are independent of the topic of the article;
computer readable program code configured to create, using a natural language processing algorithm and from the topic-specific requirements, at least one query from the input, wherein the at least one query comprises a machine language query expression, wherein the creating comprises augmenting the at least one query based upon at least one of the non-topic-specific requirements, wherein the creating comprises expanding the input by adding additional query expressions to the at least one query, wherein the additional query expressions are based in part on subsections added to the input, wherein the subsections are identified based upon a logical connection between a topic corresponding to the subsection and the input;
computer readable program code configured to retrieve, from secondary data sources identified using a resource crawler and by performing a search at the secondary data sources utilizing the query, structured information contextually relevant to the topic, wherein at least one of the secondary data sources comprises an unlabeled secondary data source accessible to an article generation system; and
computer readable program code configured to, from the structured information, generate, using an article generator component of the system and comprising a context encoder, query encoder, and decoder, the article, wherein the article comprises a coherent and grammatically fluid structured article generated in view of the topic-specific requirements and the non-topic-specific requirements, wherein the generating comprises joining, utilizing at least one algorithm, sections of the structured information, wherein the utilizing at least one algorithm comprises applying the at least one algorithm to each of the sections to identify a coherence of the joining of the sections.

12. A computer program product, comprising:
a non-transitory computer readable storage medium having computer readable program code embodied therewith, the computer readable program code being executable by a processor and comprising:
computer readable program code configured to receive, from a user, input for generating an article, wherein the input comprises (i) an indication of topic-specific requirements for the article that are dependent upon a topic of the article and (ii) an indication of non-topic-specific requirements for the article that are independent of the topic of the article;
computer readable program code configured to create, using a natural language processing algorithm and from the topic-specific requirements, at least one query from the input, wherein the at least one query comprises a machine language query expression, wherein the creating comprises augmenting the at least one query based upon at least one of the non-topic-specific requirements, wherein the creating comprises expanding the input by adding additional query expressions to the at least one query, wherein the additional query expressions are based in part on subsections added to the input, wherein the subsections are identified based upon a logical connection between a topic corresponding to the subsection and the input;
computer readable program code configured to retrieve, from secondary data sources identified using a resource crawler and by performing a search at the secondary data sources utilizing the query, structured information contextually relevant to the topic, wherein at least one of the secondary data sources comprises an unlabeled secondary data source accessible to an article generation system; and
computer readable program code configured to, from the structured information, generate, using an article generator component of the system and comprising a context encoder, query encoder, and decoder, the article, wherein the article comprises a coherent and grammatically fluid structured article generated in view of the topic-specific requirements and the non-topic-specific requirements, wherein the generating comprises joining, utilizing at least one algorithm, sections of the structured information, wherein the utilizing at least one algorithm comprises applying the at least one algorithm to each of the sections to identify a coherence of the joining of the sections.

13. The computer program product of claim 12, wherein the creating comprises expanding the input to define a query expression.

14. The computer program product of claim 13, wherein the expanding comprises accessing a domain ontology to enrich the at least one query, by adding expressions to the at least one query.

15. The computer program product of claim 13, wherein the expanding comprises (i) adding subsections to the topic-specific requirements and (ii) utilizing the subsections within the at least one query.

16. The computer program product of claim 12, wherein the generating comprises joining the structured information into the article.

17. The computer program product of claim 16, wherein the generating comprises utilizing at least one of: a cross entropy loss algorithm and a hierarchical topic loss algorithm to maintain coherency and grammatical fluidity during the joining.

18. The computer program product of claim 16, wherein the generating comprises utilizing a hierarchical topic loss algorithm to ensure content of the article conforms to the topic-specific requirements.

19. The computer program product of claim 12, wherein the retrieving comprises (i) clustering paragraphs from the secondary sources, (ii) detecting topics within the clustered paragraphs, and (iii) identifying, utilizing the detected topics, clusters of paragraphs contextually relevant to the topic.

20. A method, comprising:
receiving, using a processor of a system, domain dependent input identifying requirements that are based upon a subject for an article to be generated;
receiving, using a processor of a system, domain independent input identifying requirements that are independent of the subject for the article to be generated;
retrieving, from secondary data sources identified using a resource crawler, structured information related to the subject by querying, using a machine language query expression, at least one resource utilizing the domain dependent input, wherein the querying comprises expanding the domain dependent input utilizing (i) at least one domain ontology and (ii) natural language processing techniques, wherein at least one of the secondary data sources comprises an unlabeled secondary data source accessible to an article generation system, wherein the retrieving comprises augmenting at least one query used in the querying based upon at least one of the domain independent input, wherein the creating comprises expanding the domain dependent input by adding additional query expressions to the at least one query, wherein the additional query expressions are based in part on subsections added to the domain dependent input, wherein the subsections are identified based upon a logical connection between a topic corresponding to the subsection and the domain dependent input; and
generating, using an article generator component of the system and comprising a context encoder, query encoder, and decoder, the article from the structured information, wherein the generating comprises joining the structured information into a coherent and grammatically fluid document by applying (i) a cross entropy loss algorithm and (ii) a hierarchical topic loss algorithm to each section of the structured information to identify a coherence of the joining of each of the sections.

* * * * *